United States Patent [19]

Eveleth

[11] 4,307,929
[45] Dec. 29, 1981

[54] METHOD OF SCANNING A LASER BEAM IN A STRAIGHT LINE

[76] Inventor: Jason H. Eveleth, Optex, Inc., 19 Manning Ave., Butler, N.J. 07405

[21] Appl. No.: 70,702

[22] Filed: Aug. 29, 1979

[51] Int. Cl.³ .................. G02F 1/33; G02B 27/17
[52] U.S. Cl. .................. 350/3.71; 350/320; 358/201
[58] Field of Search ............. 350/3.70, 3.71, 3.73, 350/3.75, 358, 128, 129, 320; 358/201

[56] References Cited

U.S. PATENT DOCUMENTS

| | | | |
|---|---|---|---|
| 3,619,033 | 11/1971 | McMahon | 350/3.71 |
| 3,630,594 | 12/1971 | Gorog | 350/3.71 |
| 3,885,143 | 5/1975 | Ishii | 350/3.75 |
| 3,922,059 | 11/1975 | Noguchi | 350/3.71 |
| 3,951,509 | 4/1976 | Noguchi et al. | 350/3.71 |
| 4,076,370 | 2/1978 | Wako | 350/3.75 |

FOREIGN PATENT DOCUMENTS 54-5453  1/1979  Japan .................. 350/3.75

Primary Examiner—John K. Corbin
Assistant Examiner—Bruce Y. Arnold
Attorney, Agent, or Firm—Finnegan, Henderson, Farabow, Garrett & Dunner

[57] ABSTRACT

A method of scanning a laser beam in a straight line is disclosed wherein a series of different frequency overlapping signals are applied to a first axis transducer of an acousto-optic modulator and a slowly varying frequency signal is applied to a second axis transducer of the acousto-optic modulator to generate a parallelogram matrix scan of a format converter which converts the scan to a linear scan focused in an image plane.

1 Claim, 11 Drawing Figures

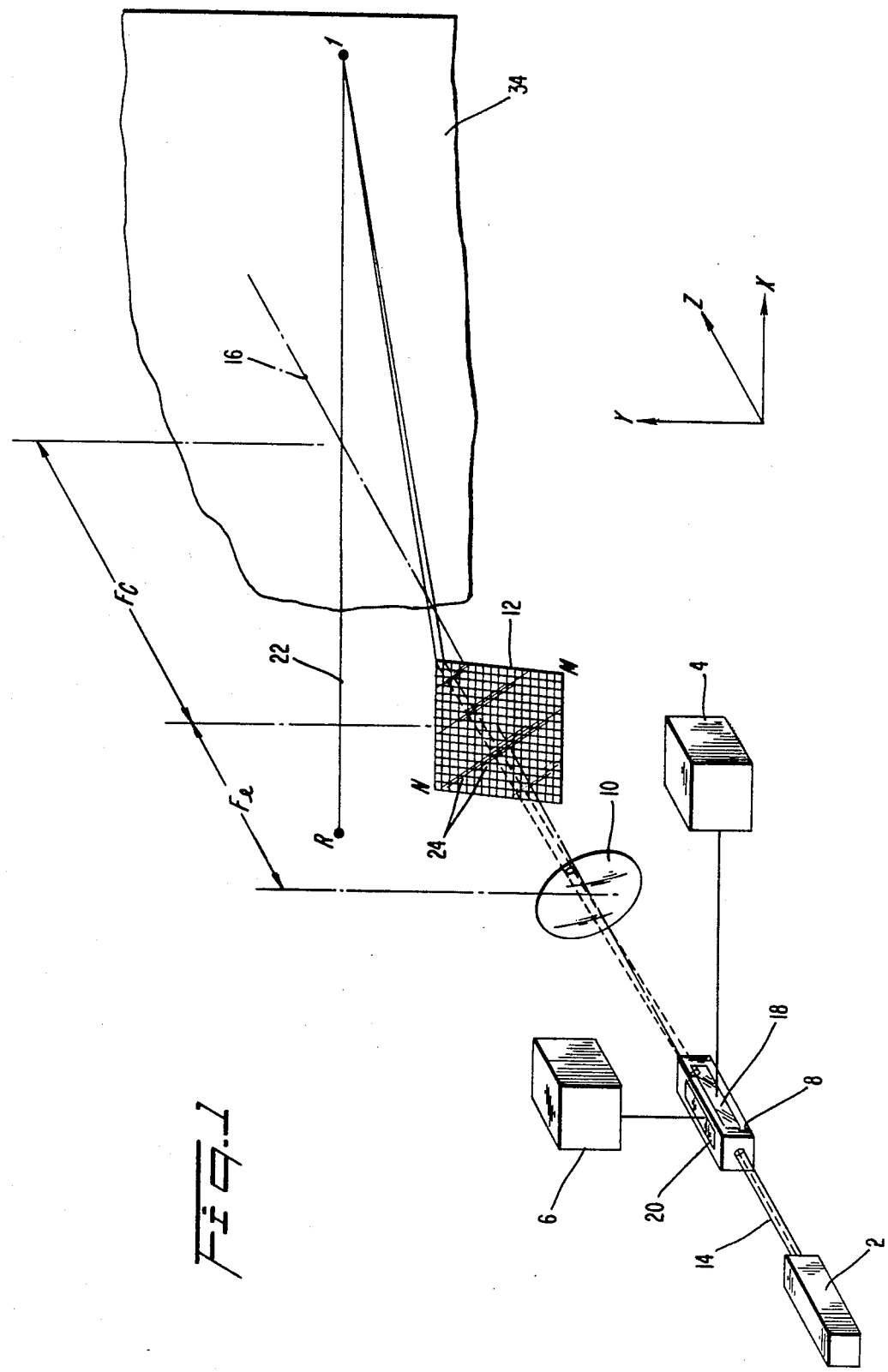

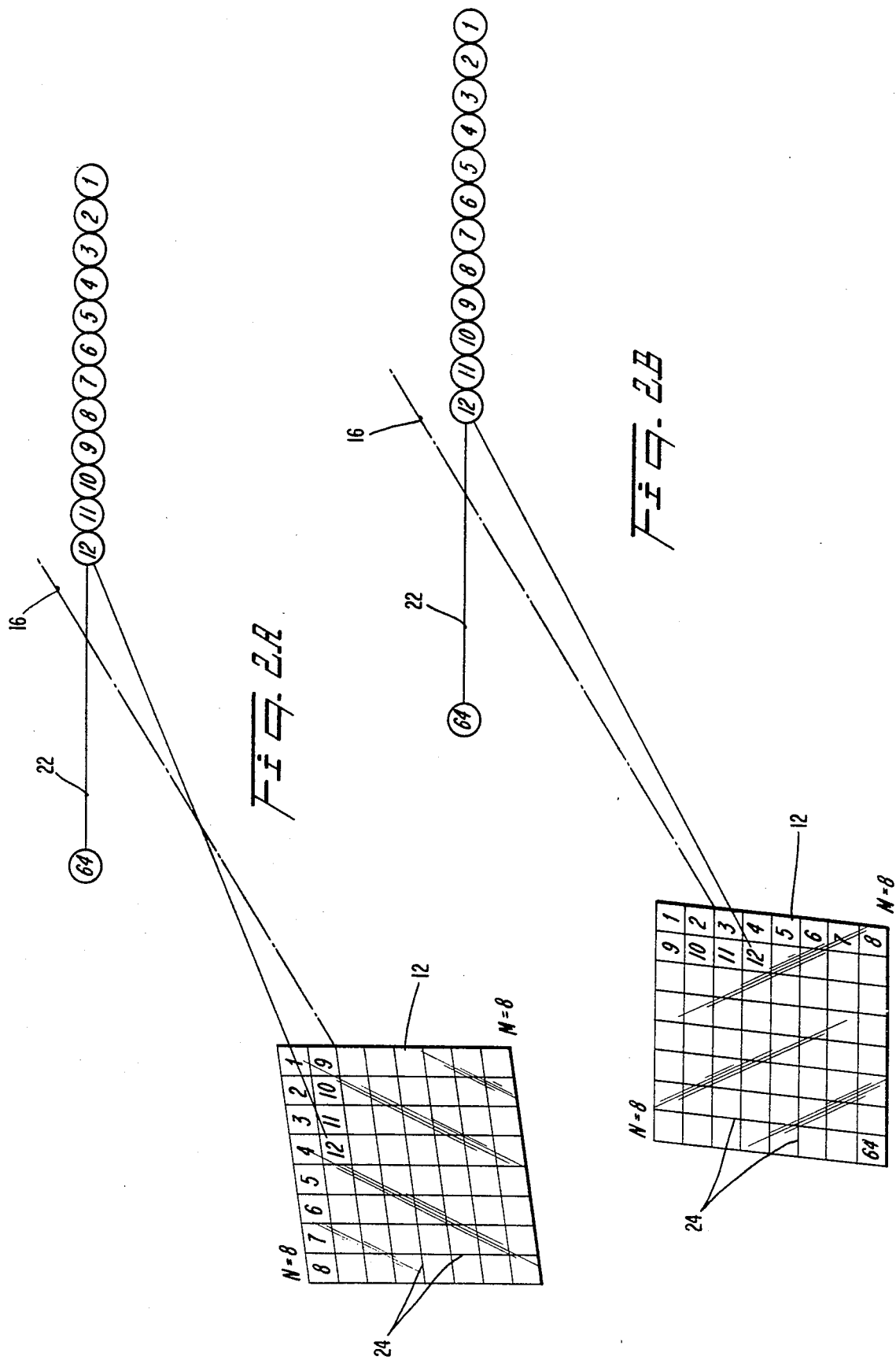

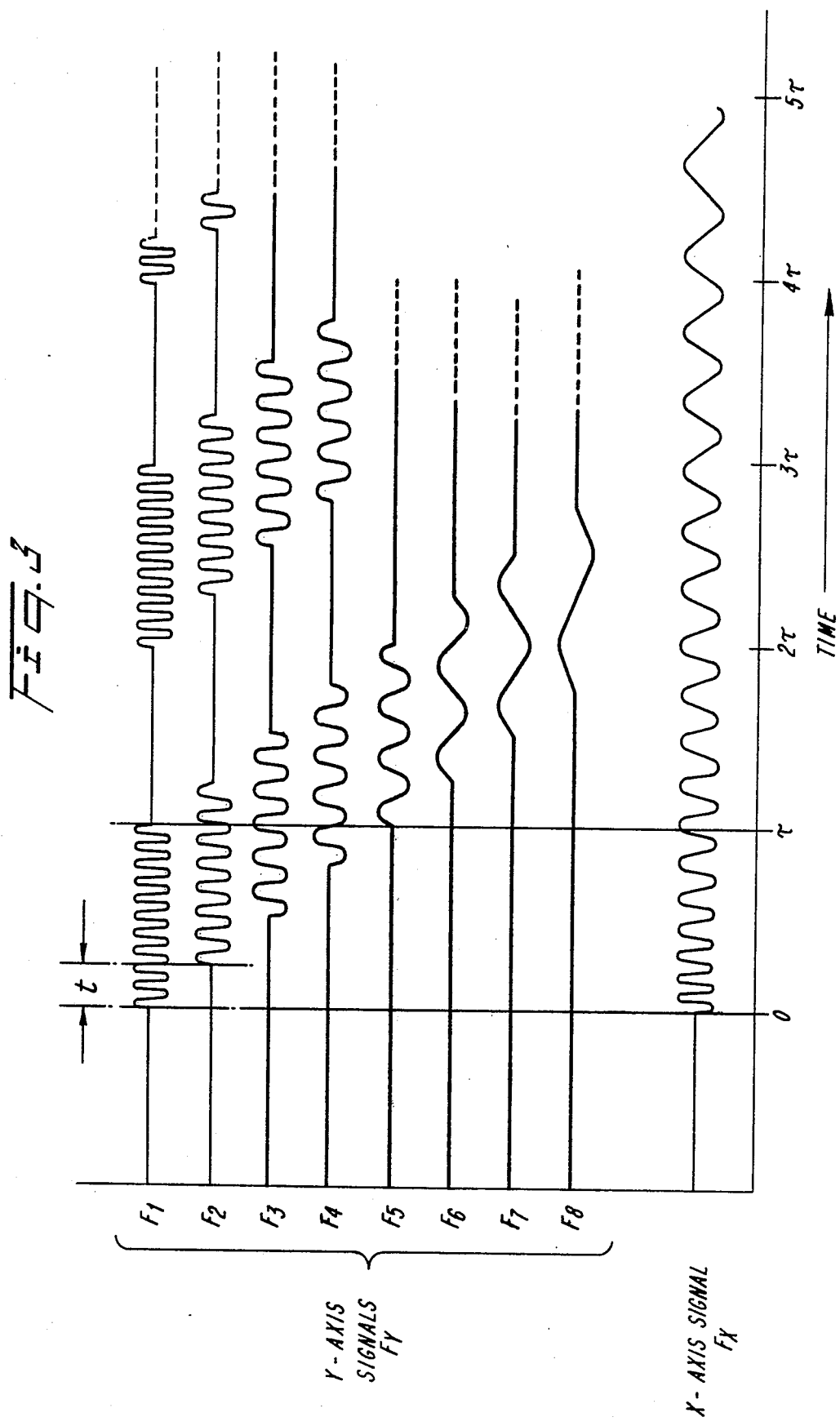

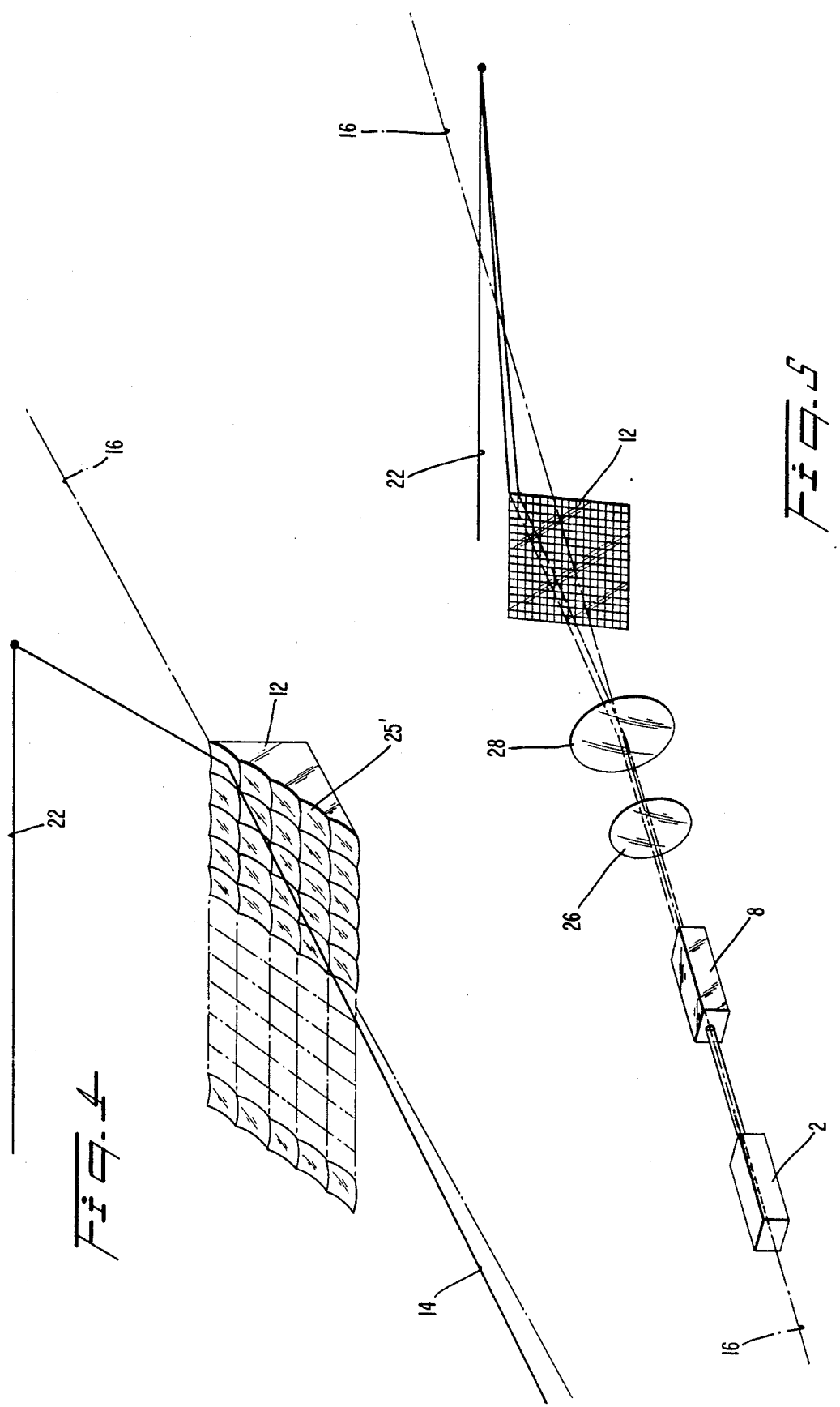

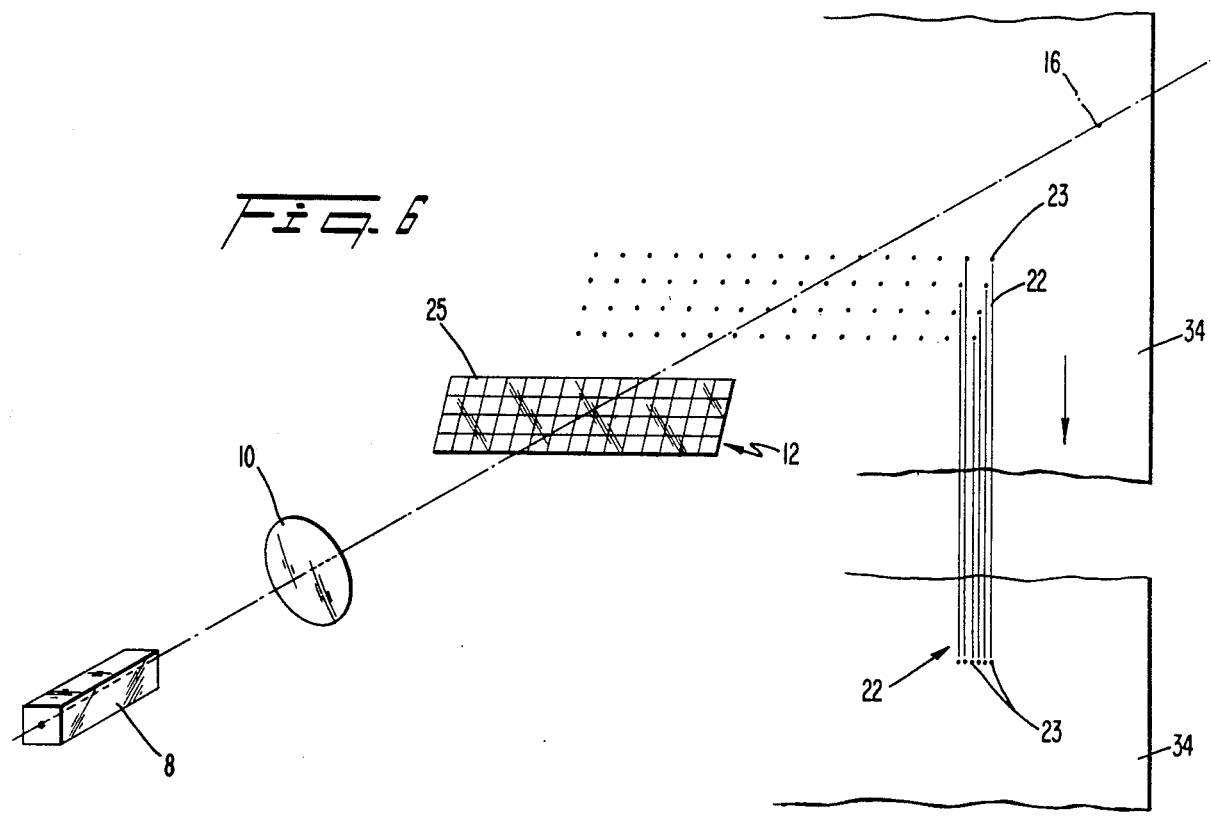
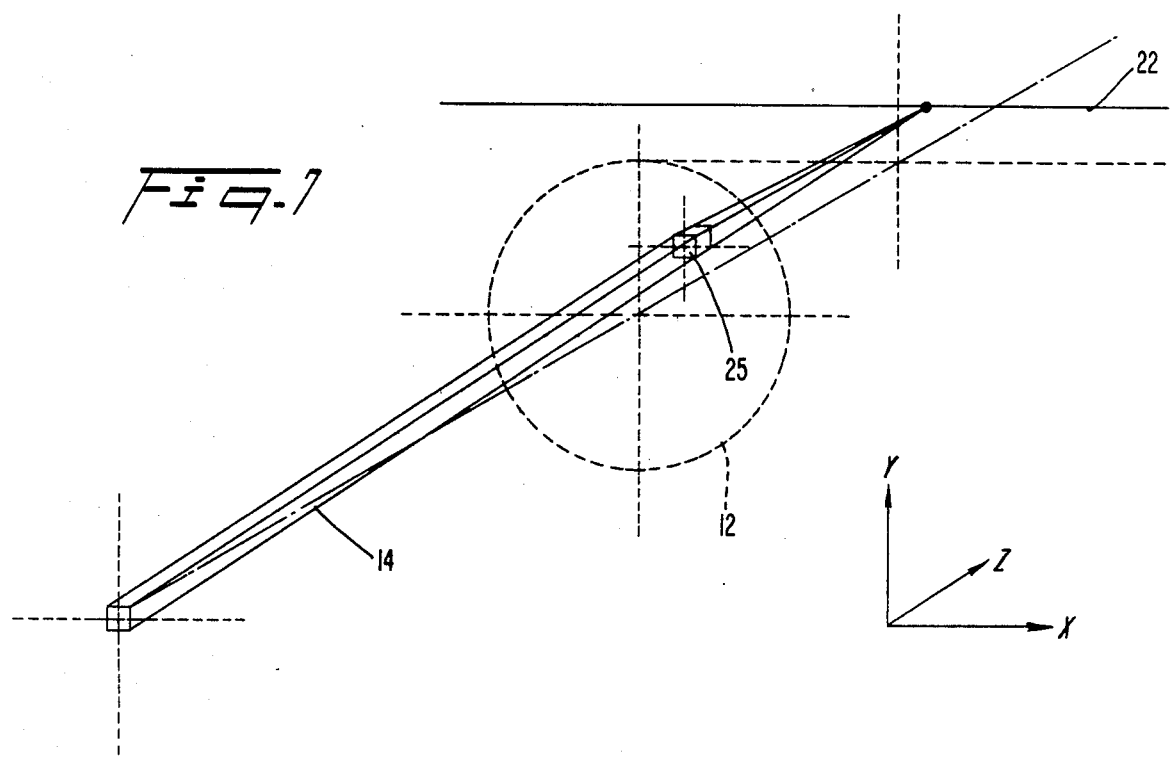

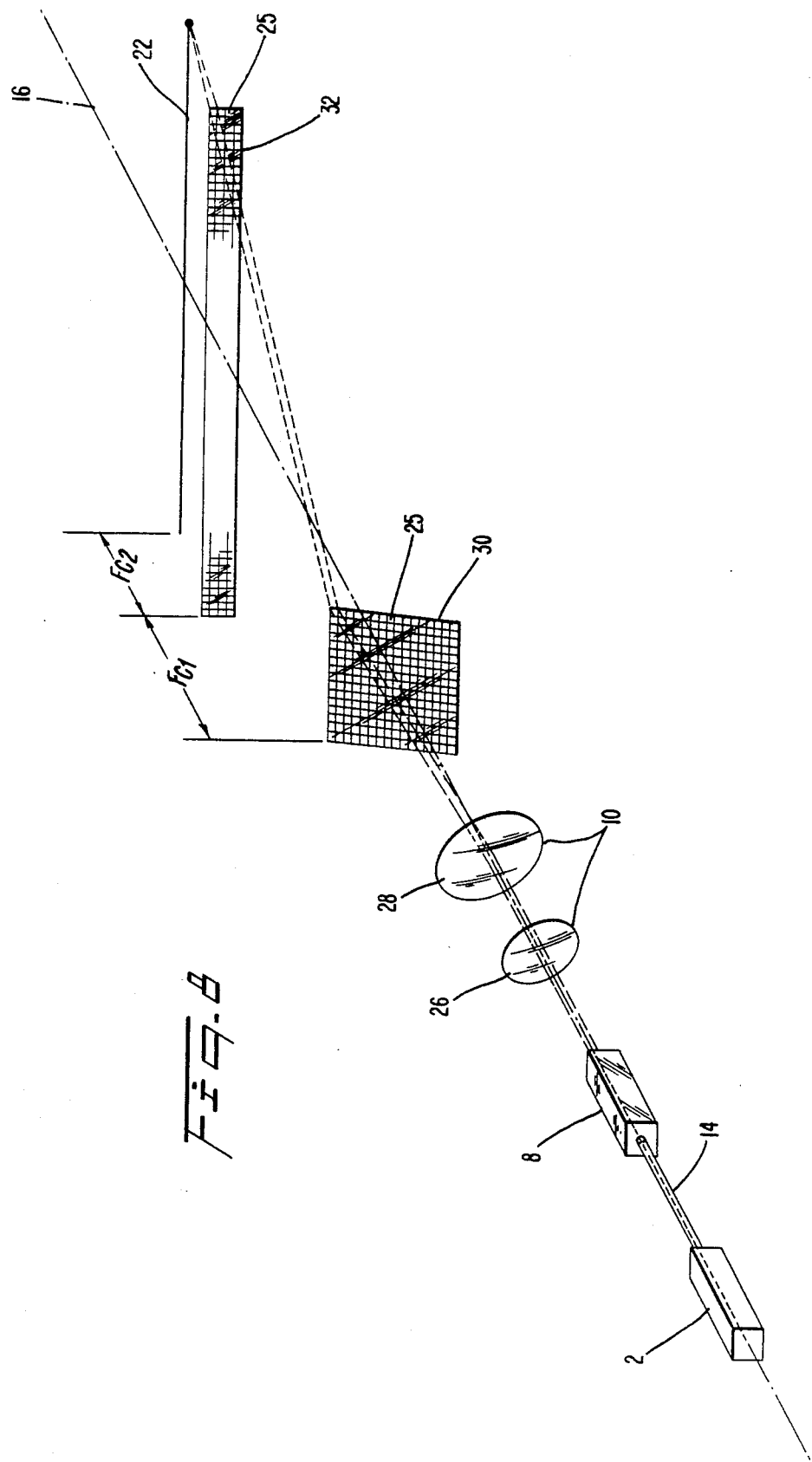

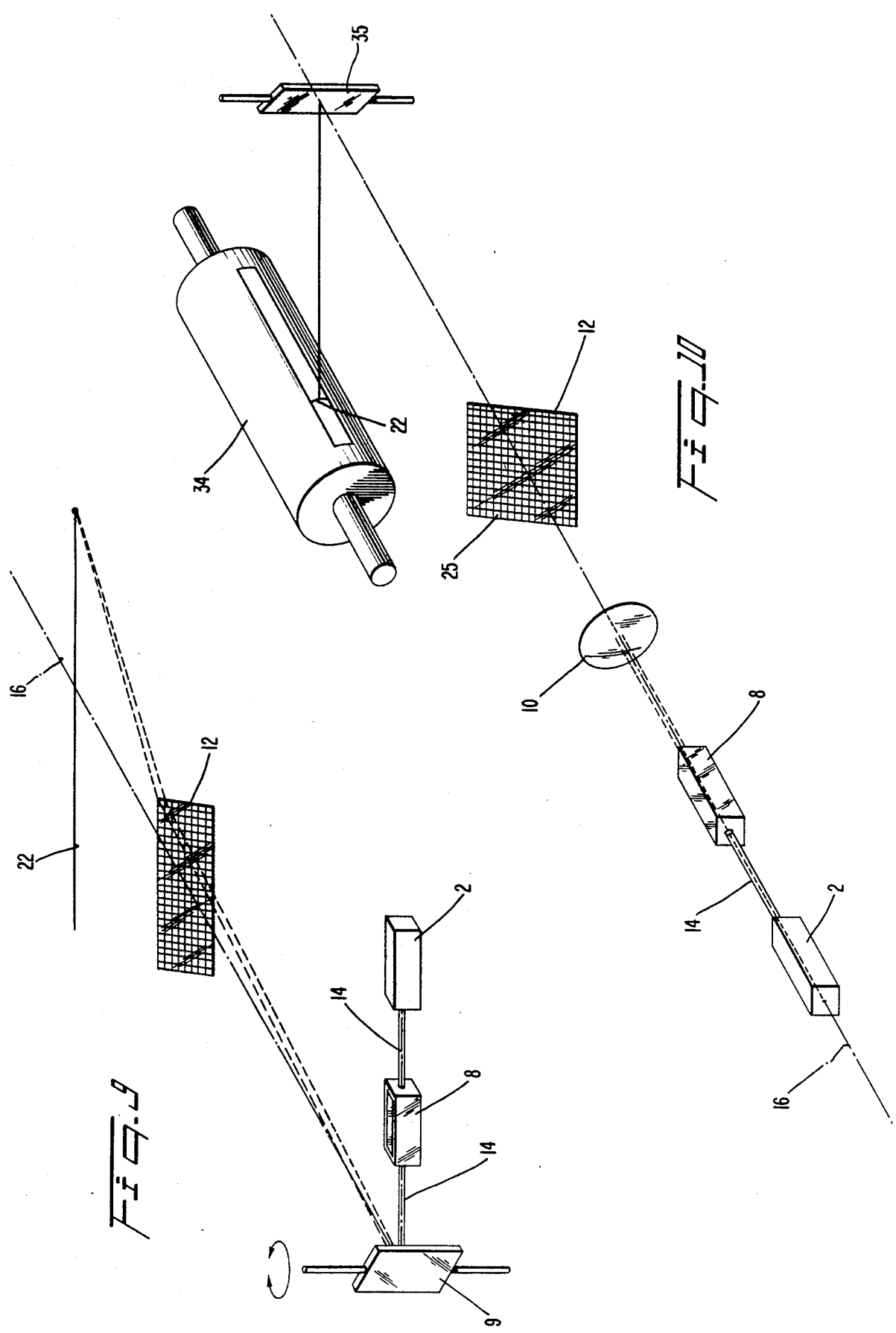

METHOD OF SCANNING A LASER BEAM IN A STRAIGHT LINE

BACKGROUND OF THE INVENTION

This invention relates to an optical scanning system used to record images such as in a phototypesetter, non-impact printer, facsimile machine, intelligent copier or computer output to a microfilm machine. It particularly relates to a solid-state scanning system which utilizes a laser as its light source.

A laser beam is a high intensity source of light which can be focused to a very fine point. Because of these properties, it finds particular utility in a scanning system to form an image on photographic film, an electrophotographic drum as in xerography or on other photosensitive media. The finely-focused spot makes possible images of small detail and its high intensity permits rapid formation of the image thereby providing the potential for a scanning system of both high resolution and high speed.

Laser scanning systems developed in the past have used mechanical means for changing the angle of the light beam to scan across the image plane. Rotating polygonal mirrors and galvanometer driven mirrors have been commonly used. More recent scanning systems, relying upon solid-state technology, have utilized the interaction of light with acoustic signals to effect the scanning action. For instance, see U.S. Pat. No. 3,851,951 issued to Jason H. Eveleth. Such systems are also discussed in Applied Optics, Vol. 5, October, 1966, pp, 1269–1638, Proceedings IEEE, Vol. 61, No. 8, August, 1973, pp. 1073–1092, and in IEEE Transactions on Sonics and Ultrasonics, Vol. SU-24, No. 1, January, 1977, pp. 7–18. In such devices the angle of deflection of the light beam is dependent upon the frequency applied to the device, the higher the frequency the larger the angle of deflection of the light beam.

In previous scanning systems, whether scanning is accomplished mechanically or by acousto-optic techniques, a separate modulator is used to vary the intensity of the laser beam as it scans to form the image. Additional means is usually provided to move the photosensitive image plane in one direction as the laser beam scans in a second direction orthogonal to the first. In this manner a two dimensional image is formed.

Mechanical scanning systems have achieved wide scan angles and high resolution; however, they generally have been slow as well as expensive to fabricate. Some mechanical systems have experienced beam position control problems because of the inertia associated with the mirrors used.

Prior acousto-optic scanners can achieve fast scanning rates; however, they generally have lacked high resolution because of limitations on the size to which acousto-optic crystals can be grown and also because of the absorption of the acoustic energy in the acousto-optic medium. Acousto-optic scanners have also been characterized by relatively narrow scan angles.

To avoid some of the limitations on mechanical scanner motion, holograms have been used to change the configuration of the scan. Such a system is described in U.S. Pat. No. 3,630,594 to Gorog. The Gorog system, however, is primarily applicable to the formation of characters such as letters of the alphabet and not to generating large area images.

Also to overcome the speed limitations of mechanical spinners, acousto-optic beam splitters have been used in conjunction with the spinners to reduce the required rotation rate. In these systems a multiplicity of modulated beams scan across the image plane forming a number of scan lines simultaneously. Substitution of a spinning ring of holograms also has been suggested in place of a faceted mirror, thereby reducing the weight of the assembly and eliminating the difficulty in reproducing the accurate facets of the mirror. Scanning apparatus using a holographic beam deflector is described in U.S. Pat. No. 4,026,630 issued to Wollenmann.

SUMMARY OF THE INVENTION

To achieve the objects and in accordance with the purpose of the invention, as embodied and broadly described herein, the laser optical scanning system of this invention which has high resolution and high speed comprises a source for producing a laser beam in a direction along a first axis of the system, x- and y-axis drive electronics for producing electronic drive signals, an acousto-optic deflector cell responsive to the electronic drive signals to deflect the laser beam selectively to angular positions relative to the first axis of the system, a lens system operative on the laser beam to convert the angular positions to corresponding spatial beam positions in the first image plane, and a format converter lying in the first image plane operative on the laser beam to convert the first spatial beam positions to corresponding second spatial beam positions focused in a second image plane. In one embodiment of the invention, the format converter consists of a two-dimensional array of lenses. By applying a particular electronic drive signal format to the acousto-optic deflector cell a sequence of angular positions is obtained which is easily converted by the format converter to a linear scan, while maintaining high scan speeds and high resolution.

Further objects and advantages of the invention can be more fully understood from the following detailed description taken in conjunction with the accompanying drawings.

BRIEF DESCRIPTION OF THE DRAWINGS

FIG. 1 is a schematic representation of a preferred embodiment of the laser scanning system in accordance with the present invention;

FIGS. 2(A) and 2(B), respectively, show scanning sequences of format converter 12 used in the present invention;

FIG. 3 shows the x-axis and y-axis drive signals used for one scanning sequence in the present invention;

FIG. 4 is a schematic representation of an array of small spherical mirrors which can be used as a format converter;

FIG. 5 is a schematic representation of yet another preferred embodiment of the laser scanning system in accordance with the present invention;

FIG. 6 is a schematic representation of yet another preferred embodiment of the laser scanning system in accordance with the present invention;

FIG. 7 is a schematic representation showing a preferred function of an element in the converter used in the invention;

FIG. 8 is a schematic representation of yet another preferred embodiment of the laser scanning system in accordance with the present invention;

FIG. 9 is a schematic representation of yet another preferred embodiment of the present invention using a rotating mirror;

FIG. 10 is a schematic representation of yet another preferred embodiment of the laser scanning system in accordance with the present invention.

DESCRIPTION OF THE PREFERRED EMBODIMENTS

Referring to the drawings, FIG. 1 illustrates a laser optical scanning system according to the present invention which includes a laser source 2, means for producing electronic drive signals 4, 6, means for deflecting the laser beam 8, lens means 10, and format converter 12.

Preferably, laser source 2 produces laser beam 14 in a direction along a first axis 16 of the scanning system. Axis 16 is the z-axis of the system as shown in FIG. 1.

Laser beam 14 passes through means for deflecting it, here embodied as an acousto-optic beam deflector 8. It will be recognized that two beam deflectors could be used in place of the deflector 8, each providing single axis deflection of beam 14. The acousto-optic beam deflector 8 is aligned coincident with the first axis 16 of the system and has first and second transducers 18, 20 mounted on orthogonal faces of the deflector 8 parallel with the first axis 16.

As here embodied, transducers 18, 20 are piezoelectric transducers which can convert electronic signals into sound waves which interact with light waves to diffract the laser beam. The angle of diffraction is dependent on the frequency of the input signals to transducers 18, 20. The first transducer 18 is affixed orthogonally to the x-axis of the scanning system and causes beam 14 to be deflected in the x-axis of the system relative to the y-z plane. The second transducer 20 is affixed orthogonally to the y-axis of the scanning system and causes beam 14 to deflect in the y-axis relative to the x-z plane.

In accordance with the invention, means is provided for producing electronic drive signals to drive transducers 18, 20. The x-axis drive electronics 4 apply electronic drive signals to first transducer 18 and y-axis drive electronics 6 apply electronic drive signals to second transducer 20. The format of the drive signals applied by the electronic drive units 4, 6 are arranged in such a way that modulation of the intensity of laser beam 14, i.e. z-axis modulation, is possible without the introduction of a separate modulator. This is described below.

As here embodied, transducers 18, 20, respectively, act on beam 14 to deflect it into N different angular positions in the x-axis direction and into M different angular positions in the y-axis direction. Consequently, the total number of resolvable positions R is the product of M and N. The two axis deflection of the present scanning system makes possible line scanning wherein there are M×N spots on a single line, but the maximum number of resolvable positions in a deflector axis is only N or M, whichever may be the larger. If N and M are equal, as in the case of a square configuration, the maximum resolution would be the square root of R. It will be seen that this arrangement effectively squares the resolving power of the acousto-optic deflector.

The scanning of the scan line 22 may take place repeatedly as the photosensitive material 34 at the image plane moves in the y direction. This action forms a two dimensional image.

More specifically, in reference to the embodiment of FIG. 1, beam 14 is deflected into R angular positions corresponding to positions 24 of a square matrix (as discussed below the matrix is slightly canted and not truly rectangular). The R angular positions are converted to spots on scan line 22. Preferably the conversion is accomplished by the action of lens means 10 and format converter 12 on laser beam 14 after the beam passes through acousto-optic deflector 8. It will be understood that beam 14 is preliminarily deflected in accordance with the selection of the electronic drive signals applied to acousto-optic cell 8. The conversion to the linear scan is thus the combined result of deflecting beam 14 through a series of angular positions determined by the electronic drive signal format applied to acousto-optic cell 8 and the subsequent action of lens means 10 and format converter 12 on the deflected beam 14.

As here embodied, lens means 10, having a focal length of $F_1$, converts the angular positions R of beam 14 to corresponding spatial beam positions in a first image plane set orthogonal to axis 16. The first image plane is positioned at a distance $F_1$ from lens means 10 and at right angles to axis 16.

In accordance with the invention, format converter 12 lying in the first image plane is operative on laser beam 14 for converting the first spatial beam positions to corresponding second spatial beam positions focused in a second image plane which is located at a distance $F_c$ from converter 12 and at right angles to axis 16. As here embodied, format converter 12 converts the rectangular or square array of the first spatial beam positions to a linear set of second spatial beam positions at scan line 22. Scan line 22 is located in the second image plane. Format converter 12 may, if required, amplify the angles generated by acousto-optic deflector 8 thereby increasing the length of linear scan in the second image plane.

Preferably format converter 12 can take the form of a two dimensional array of lenses 25 wherein each lens corresponds in location to a particular one of the first spatial beam positions 24. Each lens 25 in the two dimensional array may perform as many as three functions—focusing the beam at scan line 22, redirecting the beam to the proper angle in the x-z plane and redirecting the beam to the proper angle in the y-z plane. If lenses 25 act to redirect the beam angularly, they are used off their optical axes as shown in FIG. 7. In alternative embodiments, as discussed in more detail below, format converter 12 can consist of a set of elements such as optical lenses, prisms, mirrors, holograms, or combinations of these elements.

Laser beam 14 scans format converter 12 in one of two alternative sequences of the spatial positions of converter 12 as shown in FIGS. 2(A) and 2(B). As here embodied, converter 12 consists of a two-dimensional square array of sixty-four elements 25 where each element, for instance, can be a separate lens. In the case of a square array, the dimensions are equal, N=M=8. As will be further explained below, the array in FIG. 2(B) is comprised of N columns of lens elements 25 which cant slightly to the right with respect to the y-axis of the system and M rows parallel to the x-axis of the system. For the array in FIG. 1(A) the cant is with respect to the x-axis.

In the FIG. 2(A) embodiment, the individual lens elements 25 in each row are addressed sequentially from right to left. Each row is scanned starting with the top row and then the next adjacent row is scanned until all sixty-four lens elements 25 have been scanned. The process is then repeated.

As embodied in FIG. 2(B), laser beam 14 scans the lens elements 25 of a column from top to bottom starting with the right-most column. Each column is scanned in turn until all sixty-four lens elements 25 are scanned and the process is then repeated.

The two methods of scanning format converter 12 as depicted, respectively, in FIGS. 2(A) and 2(B), differ in that the scanning direction of adjacent lens elements 25 in converter 12 and in the linear scan 22 is the same for the sequence depicted in FIG. 2(A). However, in the FIG. 2(B) embodiment, format converter 12 is scanned in a direction orthogonal to the direction of linear scan 22. In each of FIGS. 2(A) and 2(B), it will be noted that corresponding spatial beam positions in the array of converter 12 correspond to similarly numbered spatial beam positions along linear scan line 22. Either scanning sequence of FIG. 2(A) or 2(B) can be implemented using a two dimensional array of lenses.

In accordance with the invention, the total resolution of the laser scanning system is extremely high. Acousto-optic deflector cells are commercially available which are capable of generating as many as 400 angular positions. A two dimensional version of such a deflector, when used in the system of the present invention, allows a scan line with up to 160,000 resolvable spots. Such extremely high resolution is difficult to obtain in actual practice; nonetheless, resolutions of 10,000 spots or more can be achieved with the method and apparatus of this invention using commercially available equipment.

A second necessary feature of a solid state laser scanning system, in addition to high resolution, is speed. The transit time $\tau$ of acousto-optic deflector 12 sets limits on the speed of scan and the modulation rate of the system. Transit time $\tau$ is the time it takes for the leading edge of an acoustic pulse to traverse the entire active optical aperture of the acousto-optic deflector 12. It is also the time it takes to fill the acousto-optic deflector 12 with a signal and thus the time it takes for the deflected laser beam 14 to reach maximum intensity and narrowness of focus spot at the final image plane of the system. Usually the transit time represents dead time in a scanning function comparable to the flyback time in a TV raster. Since the resolution of an acousto-optic cell is proportional to the product of its transit time and band width, previous high resolution systems exhibited large dead times and thus loss of speed.

In accordance with the present invention, this problem is overcome by applying a particular format of electronic drive signals to the x-axis and y-axis transducers 18, 20, of acousto-optic deflector cell 8 (FIG. 1). The format of electronic drive signals is designed to take account of the normal transit time in commercially available acousto-optic deflectors and yet still achieve high speed scan rates. The scanning sequence shown in FIG. 2(B) is achieved by using the electronic drive signal format shown in FIG. 3.

Referring to the scanning sequence of FIG. 2(B), it is preferred that the electronic drive signals applied to y-axis transducer 6 (FIG. 1) are a series of overlapping but different single frequency pulses as shown in FIG. 3. As here embodied, M different signals $F_1$ to $F_8$ where $M=8$, are required, each signal being of a particular frequency for selecting an individual element 24 in a column of the two-dimensional array of format converter 12. For instance, electronic drive signal $F_1$ deflects a portion of laser beam 14 to lens element 25 in the first row of converter 12, electronic drive signal $F_2$ deflects a portion of laser beam 14 to another element 25 in the second row, and so on for the remaining elements 25 in a given column. As here embodied, an electronic drive signal $F_x$ is simultaneously applied to x-axis transducer 18 to deflect beam 14 across the columns of converter 12. The signal $F_x$ is a slowly changing frequency signal which scans laser beam 14 slowly through an angle in the x-z plane of the system. Thus, after M electronic drive signals, in this case $F_1$ through $F_8$, have been applied to y-axis transducer 18, the $F_1$ signal is repeated. Since the $F_x$ signal applied to the x-axis transducer moves laser beam 14 one element to the left during one vertical scan, the next adjacent column element $M+1$ is then addressed. As here shown, element $M+1$ is element $e_9$.

The above operation is based upon the concept that if two or more electronic drive signals of different frequencies are applied to acousto-optic deflector 8, beam 14 will be separated into two or more beams at angles corresponding to the particular frequencies of the applied signals. In accordance with the invention, using the signal format shown in FIG. 3, each signal $F_1$ to $F_8$ begins a period t after the preceeding signal and lasts a period equal to at least $\tau$. As a consequence, a new position 24 on the array of converter 12 begins to be illuminated every interval of time t.

In accordance with the invention, the intensity of laser beam 14 can easily be modulated. If, for instance, one of the signals $F_1$ to $F_8$ is missing in the sequence, then one of the element positions in the array of converter 12 will not be addressed and the corresponding spot in scan line 22 will be missing. Likewise, if the amplitude of one of the signals $F_1$ to $F_8$ is diminished, the light intensity of beam 14 and the intensity of its corresponding position in scan line 22 will be reduced. As a consequence, light beam 14 can be modulated to form an image without the addition of a separate light modulator to the system. The modulation rate is the reciprocal of the time interval t.

As here embodied, using the scanning sequence of FIG. 2(B) controlled by the signal format of FIG. 3, it is clear that no part of signal $F_1$ corresponding to element $e_1$ of the array of format converter 12 can be in acousto-optic deflector 8 when the signal $F_1$ corresponding to the $M+1$ element, i.e., element $e_9$, enters the cell. If this condition is not met, element $e_9$ will be modulated by element $e_1$ information. If the duration of each signal $F_1$ to $F_8$ is set at $\tau$, then some portion of each signal will be in the acousto-optic deflector 12 for a period $2\tau$. The period $2\tau$ is the time that it takes for the leading edge of the signal to traverse the deflector 12 plus the time it takes for the entire signal of period $\tau$ to traverse the cell assuming the shortest possible signal is used. Thus, a column of the array of format converter 12 cannot be scanned in the sequence shown by FIG. 2(B) in a period less than $2\tau$. Therefore, the shortest interval between the start of signals in the signal sequence $F_1-F_8$ is $t_{min}=2\tau/M$ and the maximum modulation rate is consequently $f_{max}=M/2\tau$. To a first approximation the resolution of an acousto-optic deflector is $\tau\Delta f$, wherein $\Delta f$ is the bandwidth of the deflector. Therefore, $M=\tau\Delta f$ which results in $t_{min}=2/\Delta f$ and $f_{max}=\Delta f/2$. Since the bandwith of an acousto-optic deflection can be large, on the order of 10's of MHz, the modulation rate can be high, commensurate with the requirement of high speed scanning.

The total time scan T to scan linear line 22 is a minimum of $2N\tau$, where N is the number of columns in the array of format converter 12. Since $\tau$ generally will have a value between 1 and 20 usec and N is at most a few hundred, the time required to scan a line will be on the order of a few hundred to a few thousand microseconds. If the photosensitive plane is travelling at a velocity of many inches per second, page-sized images can be produced in less than a second in some cases.

In accordance with the present invention, the design of the electronic drive signal format, as shown in FIG. 3, places some constraints on the geometry of format converter 12 because scanning in the x-axis proceeds slowly and continuously. Referring to the scan sequence of FIG. 2(B) for instance, the electronic drive signal format requires that signals $F_8$ and $F_1$ corresponding, respectively, to elements 8 and 9 are in deflector 12 simultaneously, signal $F_1$ being started at a period t later than signal $F_8$. Since the amount of deflection imparted to beam 14 by the x-axis deflector 12 during period t is very small, element $e_9$ must be located almost directly above element $e_8$ in the array of format converter 12. Thus the matrix of elements 24 of converter 12 is in the shape of a parallelogram, the rows being aligned parallel to the x-axis and the columns being canted to the right with respect to the y-axis. Assuming the scanning system is operated at its maximum rate, the trailing edge of signal $F_1$ corresponding to element $e_1$ is just leaving acousto-optic deflector 12 as signal $F_8$ corresponding to element $e_8$ is beginning and signal $F_1$ corresponding to element $e_9$ is about to start. Meanwhile, laser beam 14 has been deflected from the righthand edge of the first column containing elements $e_1-e_8$ almost to the righthand edge of the second column containing elements $e_9-e_{16}$ by the signal $F_x$.

Referring again to FIG. 1, it is preferred that laser beam 14 have a diameter approximately the same as the area of an individual element 25 of format converter 12. Therefore, there may be spillover of beam 14 from element $e_1$ into element $e_9$ of converter 12 as beam 14 moves from element $e_1$ to element $e_9$. To reduce this effect, beam 14 can be made smaller in the x dimension than in the y dimension, or the scanning of a column may be done in a time greater than $2\tau$.

Signal formats other than those shown in FIG. 3 can be used with the converter to cause scanning action. Other formats, however, have disadvantages which result in scanning systems of limited usefulness. For instance, each element 25 of the converter array could be selected by x-axis and y-axis signals of a duration $\tau$, followed by an off period of $\tau$, allowing the cell to be cleared. The scanning action using this signal format would be extremely slow, requiring a period of $N \times M \times \tau$ to be completed. The highest modulation rate would be $1/(2\tau)$.

Another signal format causes the laser beam to scan down a column using a continuously varying frequency in the same fashion as the beam scans across the columns in the sequence depicted in FIG. 2(B). This approach has several disadvantages, of which the most serious are (1) the need for a separate modulator to modulate the intensity of the beam in the z-axis, (2) a dead time of $\tau$ is required at the end of each column during which no scanning action is possible, and (3) the beam will at times during the scan overlap two elements, thereby spilling modulation information intended for one element into a neighboring element.

Converter 12 can be implemented in a variety of ways. One of the simplest is to form an array of tiny identical optical lenses 25 as in FIG. 6. Lenses 25 are arranged in a rectangular array 12 and are scanned in the sequence shown in FIG. 2(B). It is clear from FIG. 7 that the center of each lens 25 is at a unique angle to deflector 8 along the x-axis due to the canting of the columns. Thus each lens 25 is made to address a different position in the x-axis of the system at the final image plane. Due to the motion of photosensitive material 34 at the final image plane, each resolvable spot 23 in scan line 22 will at some time fall under its corresponding lens 25 and can be exposed by laser beam 14. As can be seen from FIG. 6, scanning the array once will cause spots 23 on some scan lines 22 to be exposed. However, successive scans of array 12 will make it possible to form complete scan lines as the photosensitive material emerges from under the array. In this implementation redirection of beam 14 is not needed either in the x-or y-axis. In this embodiment a telescopic lens system as in FIG. 5 may be used to amplify the angular range of the deflector shortening the distance between it and the converter.

If reflective optics are used for each element 25 of converter 12, small spherical mirrors 25', each set at the proper angle in the x-y and y-z planes, with the proper focal length for focusing the desired point in the second image plane, could be used as shown in FIG. 4. Such an array might be molded from a master mold for ease of reproduction.

Another way of implementing converter 12 is to use an array of holograms for elements 25. A hologram has the property that it can reconstruct a laser beam of particular angular properties. Each hologram in converter 12 can have stored in it the information necessary to simulate the characteristics of two prisms and a lens to redirect and focus beam 14 as desired to achieve linear scan 22. Phase, volume holograms may be preferred as they are the most efficient type of hologram. The holograms for use in converter 12 can ideally be constructed of photopolymer materials or dye sensitized dichromated gelatins. While the manufacture of the first holographic array would likely be difficult and tedious, reproduction of the array could be relatively straightforward and inexpensive enhancing the practicality of the present scanning system.

In whatever manner the individual elements 25 of converter 12 are constructed and implemented, converter 12 must focus beam 14 at each lens element 25 of converter 12 to the proper point on scan line 22.

Because laser beams spread as they propagate due to diffraction, certain limitations are placed on the design of this scanning system for applications requiring high resolution. Another embodiment of the present invention which achieves very high resolution is shown in FIG. 8. As here embodied, the scanning system includes two format converters 30, 32. First converter 30 is used primarily to amplify the deflection angles of acousto-optic deflector 8, and second converter 32 is used to focus laser beam 14 at the second image plane on scan line 22. Preferably second converter 32 is placed close to scan line 22. The advantages of such an arrangement are (1) a maximum amount of resolution is possible as neither deflection axis is limited to a resolution less than the other, (2) the element size 25 in either converter 30, 32 is minimized because element 25 in the array of the second converter 32 need not be large since it is placed close to the scan line and this can produce a small spot and, element 25 in the first array of first converter 30 does not need to be large because it does not need to focus to a small spot, but only to a spot the size of element 25 in the array of second converter 32.

Another embodiment of the present invention is shown in FIG. 9. This scanning system is useful for high resolution systems. Preferably, x-axis deflection of laser beam 14 is effected by rotating mirror 9. Since mirrors are capable of high angular deflection, this embodiment allows the use of a single converter 12 which is long in the x-axis and is located near the scan line similarly to the placement of the second converter 32 in FIG. 8. Two of the essential features of the invention, the use of a format converter and the special signal format applied to acousto-optic cell 8 are preserved, but the system is no longer fully solid state.

The final embodiment illustrated is shown in FIG. 10. In this embodiment, the objectives of the invention—a high speed, high resolution scanning system—are met. A mechanical deflector 35 is located between converter 12 and scan line 22. This allows deflector 35 to deflect the line scan in the x-dimension so that a two-dimensional image is formed. Such a scanning system is useful for writing rows of characters in a printer application where the photosensitive material is a xerographic drum 34 for instance.

As an illustration of an embodiment of the invention, consideration is given to a scanning system in accordance with the embodiment of FIG. 1 which will produce an 8½ inch scan line with a density of 300 spots/inch on a photoconductive drum which is revolving at a rate of 6 inches per second.

The total resolution of the scan line 22 is 2,560 spots, the spot size is 0.0846 mm, the time consumed in scanning a line is 555.6 usec and the spot rate is 4.56 MHz.

For convenience, converter 12 may be ten times longer than it is high. As a result there are 160 columns and 16 rows of lenses 25. This array may be produced using plastic lens replication techniques. Deflector 8 may be a two axis unit made of TeO₂ which is a readily available acousto-optic material. Such deflectors may be obtained at a center frequency of 100 MHz and exhibit bandwidths of 35 MHz and transit times up to 10.7 usec. Since the resolution of one axis is ten times larger than the other, one deflection axis may use a transit time of only 1.07 usec. The laser used may be a 5 milliwatt HeNe unit which emits light at a wavelength of 632.8 nm.

The distance from deflector 8 to converter 12 may be, for example, 24 inches and the focal length of a lens 25 in converter 12 may be 20 mm.

Since the beam diameter of the laser may be 0.65 mm in commercially available units a 10 x anamorphic beam expander may be placed between the laser and the deflector to produce the 6.5 mm by 0.65 mm beam required by the deflector. A similar optical assembly in reverse may be placed between deflector 8 and converter 12 to amplify the angular range of the converter and decrease the distance between deflector 8 and converter 12.

This illustrative example has the advantage of simplicity and can be constructed with commercially available components.

What is claimed is:

1. A method of scanning a laser beam in a straight line comprising the steps of:

generating a laser beam in a direction along a first axis;

applying a series of different frequency overlapping signals to a first axis transducer of an acousto-optic cell to produce corresponding first series acoustic signals in said acousto-optic cell;

applying a slowly-varying frequency signal to a second axis transducer of said acousto-optic cell to produce a corresponding second series acoustic signals orthogonal to said first series acoustic signals in said acousto-optic cell;

deflecting said laser beam responsive to said first and second acoustic signals in a pattern to scan a format converter arranged in a parallelogram matrix;

converting the scan of the parallelogram matrix by said laser beam to a linear scan; and focusing said linear scan in an image plane.

* * * * *